US010618111B2

(12) United States Patent
DeMuth et al.

(10) Patent No.: US 10,618,111 B2
(45) Date of Patent: Apr. 14, 2020

(54) HEAT TREATMENT TO ANNEAL RESIDUAL STRESSES DURING ADDITIVE MANUFACTURING

(71) Applicant: LAWRENCE LIVERMORE NATIONAL SECURITY, LLC, Livermore, CA (US)

(72) Inventors: James A. DeMuth, Livermore, CA (US); Andrew Bayramian, Manteca, CA (US); Bassem S. El-dasher, Sammamish, WA (US); Joseph C. Farmer, Tracy, CA (US); Kevin J. Kramer, Redmond, WA (US); Alexander Rubenchik, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 281 days.

(21) Appl. No.: 15/008,989

(22) Filed: Jan. 28, 2016

(65) Prior Publication Data

US 2017/0217093 A1    Aug. 3, 2017

(51) Int. Cl.
| | | |
|---|---|---|
| B22F 3/105 | (2006.01) | |
| B33Y 40/00 | (2020.01) | |
| B22F 3/24 | (2006.01) | |
| B33Y 10/00 | (2015.01) | |
| B33Y 30/00 | (2015.01) | |

(52) U.S. Cl.
CPC .............. *B22F 3/1055* (2013.01); *B22F 3/24* (2013.01); *B33Y 40/00* (2014.12); *B22F 2003/1056* (2013.01); *B22F 2998/10* (2013.01); *B33Y 10/00* (2014.12); *B33Y 30/00* (2014.12); *Y02P 10/295* (2015.11)

(58) Field of Classification Search
CPC ...... B29C 67/0077; B33Y 30/00; B33Y 10/00
See application file for complete search history.

(56) References Cited

U.S. PATENT DOCUMENTS

| | | | |
|---|---|---|---|
| 4,944,817 A * | 7/1990 | Bourell ................... | B22F 3/004 156/272.8 |
| 5,155,324 A | 10/1992 | Deckard et al. | |
| 2012/0132631 A1 | 5/2012 | Wescott et al. | |

(Continued)

FOREIGN PATENT DOCUMENTS

| | | |
|---|---|---|
| DE | 102009051551 A1 | 5/2011 |
| DE | 102010048335 A1 | 4/2012 |

(Continued)

OTHER PUBLICATIONS

International Search Report for PCT/US17/012546, corresponding to U.S. Appl. No. 15/008,989, 14 pages.

(Continued)

*Primary Examiner* — Jacob T Minskey
*Assistant Examiner* — Melody Tsui
(74) *Attorney, Agent, or Firm* — Harness, Dickey & Pierce, PLC

(57) ABSTRACT

An additive manufacturing system having a heat source for melting powder particles in a desired shape and pattern to produce a product. A secondary heat source is used for heat treating the product to achieve heat treatment. The secondary heat source is used to peen or anneal residual stresses caused by the additive manufacturing process.

9 Claims, 1 Drawing Sheet

(56) References Cited

U.S. PATENT DOCUMENTS

| | | | |
|---|---|---|---|
| 2014/0271328 A1* | 9/2014 | Burris | B23K 26/034 |
| | | | 419/53 |
| 2014/0367894 A1* | 12/2014 | Kramer | B33Y 10/00 |
| | | | 264/482 |
| 2015/0064048 A1 | 3/2015 | Bessac et al. | |
| 2015/0273631 A1 | 10/2015 | Kenney et al. | |

FOREIGN PATENT DOCUMENTS

| | | |
|---|---|---|
| DE | 102013205029 A1 | 9/2014 |
| EP | 0529816 | 3/1993 |
| JP | 01-244609 | 9/1989 |
| WO | 2013140147 A1 | 9/2013 |

OTHER PUBLICATIONS

Supplementary European Search Report and Written Opinion for corresponding European Patent Application No. 17 744 6663 dated Feb. 5, 2019, 9 pp.

* cited by examiner

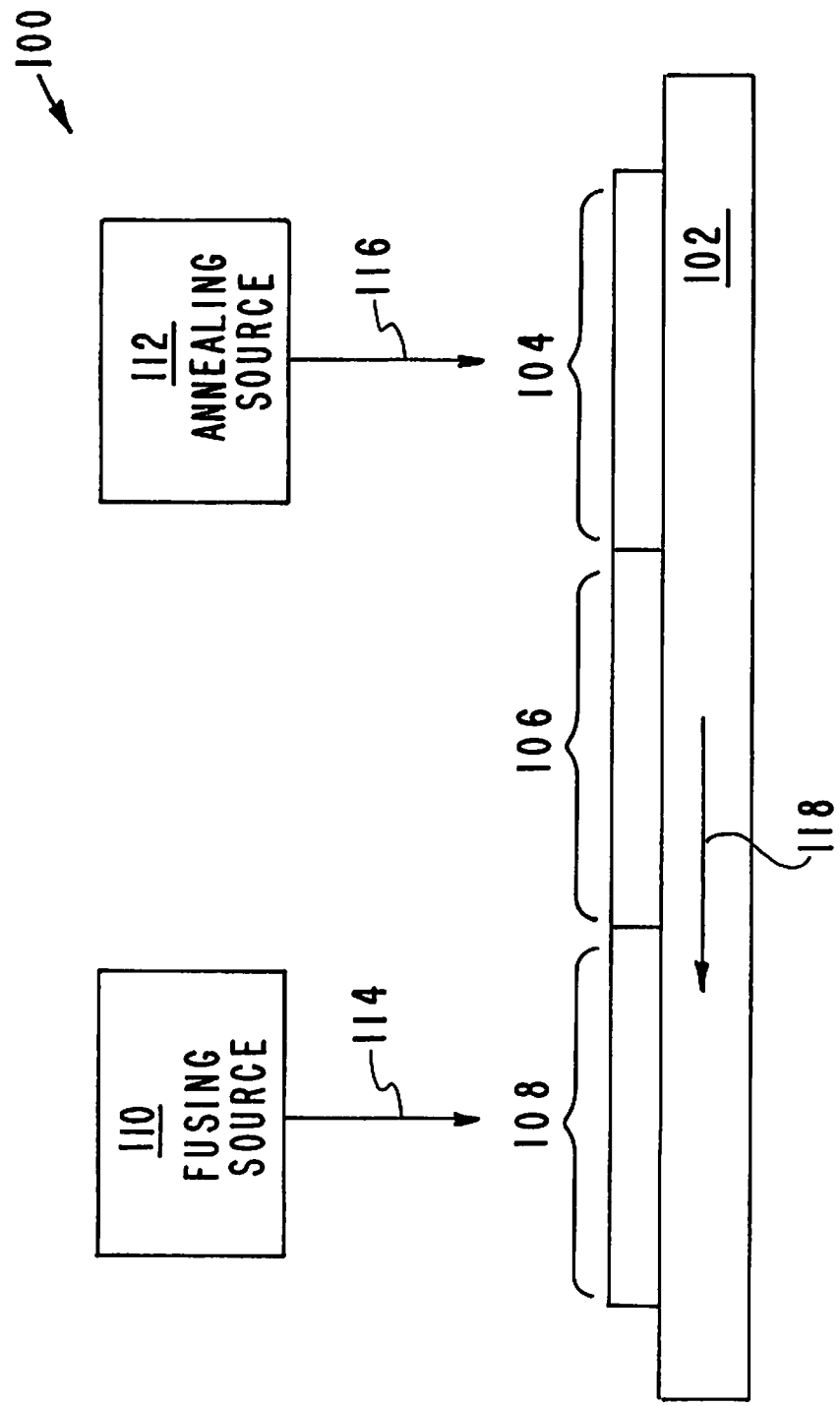

HEAT TREATMENT TO ANNEAL RESIDUAL STRESSES DURING ADDITIVE MANUFACTURING

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to heat treatment to anneal residual stresses during additive manufacturing.

State of Technology

This section provides background information related to the present disclosure which is not necessarily prior art.

U.S. Pat. No. 4,944,817 for multiple material systems for selective beam sintering issued Jul. 31, 1990 to David L. Bourell et al and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layerwise cross-scanning issued Oct. 12, 1992 to Carl R, Deckard et al, University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus and methods provide an additive manufacturing system wherein, after one or more layers have been deposited, a secondary energy source is used to peen or anneal residual stresses caused by the additive manufacturing process. The problem the inventors' apparatus and methods address is the residual stresses within the manufactured part during and after the additive manufacturing process. Residual stresses are inevitable in the prior art additive manufacturing due to localized heat deposition into the powder bed, and the cooling process that follows. Residual stresses can weaken the part being formed and cause changes in dimension while being formed, or afterwards. These stresses can cause internal cracking or yielding and present a serious problem in additive manufacturing technology.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

An embodiment of the inventor's apparatus, systems, and methods is illustrated in the single FIGURE of drawings.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Additive manufacturing, or 3D printing, is the process of turning digital designs into three-dimensional objects. It is a convenient and affordable way to make prototypes as well as finished products, making it popular with businesses, hobbyists and inventors. One of the technologies used by today's 3D printers is called selective laser sintering (SLS). SLS is a manufacturing technology that was created in the 1980s at The University of Texas at Austin. During SLS, tiny particles of plastic, ceramic or glass are fused together by heat from a high-power laser to form a solid, three-dimensional object. Another technology used by today's 3D printers is called selective laser melting (SLM). SLM is similar to SLS except that metal powder is used to form a three-dimensional product.

Like all methods of 3D printing, an object printed with an SLS or SLM machine starts as a computer-aided design (CAD) file. CAD files are converted to STL format, which can be understood by a 3D printing apparatus. Objects printed with SLS or SLM are made with powder materials, most commonly plastics such as nylon in SLS, and metal powders in SLM, which are dispersed in a thin layer on top of the build platform inside an SLS or SLM machine. A laser, which is controlled by a computer that tells it what object to "print," is incident on the platform, tracing a cross-section of the object onto the powder.

Initially a 3D model of the desired product is designed by any suitable method, e.g., by bit mapping or by computer aided design (CAD) software at a PC/controller. The CAD model of the desired product is electronically sliced into series of 2-dimensional data files, i.e. 2D layers, each defining a planar cross section through the model of the desired product. The 2-dimensional data files are stored in a computer and provide a digital image of the final product.

The digital images are used in the additive manufacturing system to produce the final product. Solidified powder particles are applied to a substrate in a layer by layer process to produce the final product. The digital image of the first 2D layer is used to produce the first layer of the desired product.

A first embodiment of the inventor's apparatus, systems, and methods is illustrated in the drawing. This embodiment is designated generally by the reference numeral 100. A delivery system directs metal powder particles from a material build supply onto a substrate 102. A fusing light source 110 directs a projected beam 114 onto the layer of metal powder particles 104 that have been deposited on the substrate 102. The digital image of the first 2D layer is used to produce the first layer of the desired product. Relative movement between the projected beam 114 and the substrate 102 is indicated by the arrow 118.

The projected beam 114 containing the digital image of the first 2D layer is projected from the fusing light source 110 onto the layer of metal powder particles 104 that has been deposited on the substrate 102. The projected beam 114 solidifies the metal powder particles according to the digital image of the first 2D layer information producing the sintered layer 106.

The sintered layer 104 is heat treated to remove residual stress in the first and subsequent layers to improve the quality of the final product. Residual stresses are common in additive manufacturing due to localized heat deposition into the powder bed, and the cooling process that follows. Residual stresses can weaken the part being formed and cause changes in dimension while being formed, or afterwards. These stresses can cause internal cracking or yielding and present a serious problem in additive manufacturing technology.

The inventor's apparatus, systems, and methods utilize a secondary energy source 112 to peen or anneal residual stresses developed during the additive manufacturing process. A beam 116 is projected from the secondary energy source 112 onto the sintered layer 104 to remove residual stress in the sintered layer and produce the final layer 108. Relative movement between the beam 116 and the substrate 102 is indicated by the arrow 118.

Once the first layer 108 is completed, production of the second layer of the product is started. A second layer of metal powder particles is applied on top of the competed first layer 108. This procedure is continued by repeating the steps and building the final product in a layer by layer process. The inventor's apparatus, systems, and methods remove residual stresses in each layer as it is formed and/or through post processing though peening or annealing through the use of lasers, diodes, other forms of electromagnetic radiation, or other heat sources.

The inventor's apparatus, systems, and methods uses laser peening and thermal annealing technology in situ with the additive manufacturing process to anneal residual stresses and harden the structure of parts as they are being created. For Direct Metal Laser Sintering (DMLS) or Diode Additive. Manufacturing (DiAM), these processes would be used intermediately between layer development (or in a post processing step) to ensure that the residual stresses in that layer(s) were eliminated. Through peening, layer hardening and uniform compressive stresses could be added internally to the part instead of just on the skin depth which is traditionally up to a couple millimeters. Upon part completion, peening and other thermal processes can be used to polish and smooth the rough and sometime "stair-stepped" edges that result from the layer by layer additive manufacturing process.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for producing a product through additive manufacturing with heat treatment, comprising:
   a substrate;
   the substrate configured to support a layer of powder particles thereon producing an interface between said layer of powder particles and said substrate;
   means for melting said powder particles with a fusing beam impressed with a two dimensional pattern containing image information from a first layer to be printed, to fuse said powder particles with said substrate in a desired shape and pattern producing fused powder particles;
   a laser for heat treating said layer of powder particles with a laser beam impressed with the two dimensional pattern containing image information from a first layer to be printed to achieve the heat treatment of the product, prior to laying down additional new layers of material;
   wherein the heat treatment comprises an annealing operation implemented using the two dimensional pattern using a laser beam from the laser on at least one or more portions of on one or more intermediate layers of the part;
   the substrate configured to further support a new layer of powdered material on top of said layer of powder particles;
   the means for melting said new layer of powder particles further being used to generate a fusing beam impressed with a two dimensional pattern containing image information from a second layer to be printed, to fuse said new layer of powder particles with said first layer in a desired shape and pattern producing a fused second layer of powder particles;
   the laser further operating to heat treat said layer of powder particles and said new layer of powdered material through a second laser beam impressed with a two dimensional pattern containing image information from the second layer to be printed to achieve heat treatment of the product, prior to laying down additional new layers of material; and
   wherein the heat treatment applied to layer and said new layer comprises additional annealing operations.

2. The apparatus of claim 1, further comprising a laser for laser peening at least one of said layer of powder particles and said new layer of powdered material.

3. The apparatus of claim 1, further comprising an additional laser for performing a laser peening operation.

4. An apparatus for producing a product through additive manufacturing with heat treatment, comprising:
   a substrate,
   a layer of powder particles on said substrate producing an interface between said layer of powder particles and said substrate,
   a heat source which generates a beam having a two dimensional pattern for melting said powder particles to fuse said powder particles with said substrate in a desired shape and pattern,
   a laser configured to generate a laser beam including the two dimensional pattern for performing an annealing operation on at least a portion of said fused powder particles to achieve heat treatment, and wherein said fused powder particles form a first intermediate layer of the product upon which an additional layer of powder particles is deposited;
   the heat source configured to generate an additional two dimensional pattern for melting an additional quantity of powdered particles deposited on said first intermediate layer, to thus fuse the additional quantity of powdered particles to the first intermediate layer to form a second intermediate layer;
   the laser further configured to generate an additional laser beam using the additional two dimensional pattern for heat treating second intermediate layer; and
   the laser further configured to perform a peening operation on one or more portions of a different layer of the product.

5. The apparatus of claim 4, wherein said heat source comprises an additional laser.

6. The apparatus of claim 4, wherein said heat source is a diode laser.

7. The apparatus of claim 4, wherein said heat source is a source of electromagnetic radiation.

8. The apparatus of claim 4, wherein said heat source is an electron beam.

9. An apparatus for producing a product through additive manufacturing with heat treatment, comprising:
- a substrate;
- the substrate configured to support a first layer of powder particles thereon, wherein said first layer of powder particles produces an interface between said first layer of powder particles and said substrate;
- means for melting said first layer of powder particles to fuse said first layer of powder particles with said substrate, using an optical beam impressed with a first two dimensional pattern, producing a first quantity of fused powder particles;
- a diode laser for heat treating said first quantity of fused powder particles of said first layer of powder particles using a first two dimensional patterned heat treating beam;
- the means for melting further configured to melt a second layer of powdered material deposited on said first quantity of fused particles using a second optical beam impressed with a second two dimensional pattern, to thus form a second quantity of fused powder particles which is fused to said first quantity of fused powder particles;
- the diode laser further configured to heat treat the first and second quantities of fused powder particles using a second two dimensional heat treating beam impressed with the second two dimensional pattern, to achieve further heat treatment on the product, prior to laying down additional new layers of material; and
- wherein the heat treatment implemented using the first and second two dimensional patterned beams comprises annealing operations using a laser beam from the diode laser.

* * * * *